(12) United States Patent
Martin

(10) Patent No.: US 6,623,014 B1
(45) Date of Patent: *Sep. 23, 2003

(54) SOUNDPROOFING SEALING JOINT FOR AN OPENING PANEL IN A MOTOR VEHICLE

(75) Inventor: Ange Martin, Franconville (FR)

(73) Assignee: BTR Sealing Systems, Nanterre (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/743,046

(22) PCT Filed: Apr. 26, 2000

(86) PCT No.: PCT/FR00/01106

§ 371 (c)(1),
(2), (4) Date: Mar. 12, 2001

(87) PCT Pub. No.: WO00/66383

PCT Pub. Date: Nov. 9, 2000

(30) Foreign Application Priority Data

May 4, 1999 (FR) .............................. 99 05645

(51) Int. Cl.[7] .................... F16J 15/02; E06B 7/16; E06B 7/22
(52) U.S. Cl. ................. 277/630; 277/641; 277/906; 49/490.1; 49/498.1
(58) Field of Search ................... 277/628, 630, 277/637, 641, 642, 906; 49/484.1, 490.1, 498.1

(56) References Cited

U.S. PATENT DOCUMENTS

| | | | | | |
|---|---|---|---|---|---|
| 2,451,450 A | * | 10/1948 | Spraragen | .................. | 49/498.1 |
| 4,042,741 A | * | 8/1977 | Bright | .................. | 264/177.16 |
| 4,448,430 A | * | 5/1984 | Bright | ........................ | 277/642 |
| 5,170,587 A | * | 12/1992 | Nakatani et al. | ....... | 296/216.09 |
| 5,462,292 A | * | 10/1995 | Yamane | ...................... | 277/637 |

FOREIGN PATENT DOCUMENTS

| | | | | | |
|---|---|---|---|---|---|
| DE | 2101419 A | * | 7/1971 | ................ | 49/490.1 |
| DE | 3413227 A1 | * | 10/1985 | ................ | 49/498.1 |
| DE | 197 20 713 C1 | | 5/1998 | | |
| EP | 0 873 897 A1 | | 4/1998 | | |
| JP | 359077938 A | * | 5/1984 | ................ | 49/498.1 |

* cited by examiner

*Primary Examiner*—Anthony Knight
*Assistant Examiner*—Michael J. Kyle
(74) *Attorney, Agent, or Firm*—Scully, Scott, Murphy & Presser

(57) ABSTRACT

In said joint, at least one first lip (17) protrudes towards the inside of a tubular profiled section from a part which is adjacent to the opening panel or frame with which it is used. At least one second lip (18) protrudes towards the inside of the tubular profiled section in the direction of the first lip (11) from the opposite portion of the wall thereto. The dimensions of the first and second lips (17,18) are such that, when the tubular profiled section is in a compressed position, said lips are brought substantially into mutual contact, preferably overlapping, or brought into contact with the wall opposite said profiled section in order to form a barrier with respect to the path of the sound waves in the direction of the passenger compartment

6 Claims, 4 Drawing Sheets

SOUNDPROOFING SEALING JOINT FOR AN OPENING PANEL IN A MOTOR VEHICLE

The present invention relates to a seal with a soundproofing effect for a motor vehicle opening leaf such as a trunk lid, tailgate, quarterlight, door or the like.

Such seals comprise, for example, a section piece forming a clip of U-shaped section, made of elastomer or plastomer, generally containing a rigid stiffener which is intended to fit onto and to grip a protruding part of the surround of the opening associated with this opening leaf in the bodywork of the motor vehicle or similar means of attachment to this surround, and at least one tubular section piece made of an elastically deformable material, generally a cellular material, protruding toward the outside from the surround and, for example, from a lateral branch or from the base of the U-section section piece that fits over a protruding edge of this surround, to which it is attached, so that it can be compressed between the opening leaf and the surround of the associated opening, when this opening leaf is in the closed position, so as to seal the vehicle.

The U-section section piece and the tubular section piece are usually made of thermoplastic or elastomeric materials and are produced by coextrusion.

Aside from its sealing role, when compressed by the opening leaf when the latter is in the closed position, the tubular section piece also has a function of soundproofing the cabin of the vehicle and it has therefore been proposed in the past that various improvements be made to this circular section piece with a view to improving its soundproofing properties.

For greater clarity, various embodiments of the prior art will be briefly described hereinbelow with reference to the following figures of the appended drawings, which depict:

FIG. 1: a cross section of a conventional seal of the state of the art, in which the single tubular section piece has no special arrangement;

FIG. 2: a cross section of another seal of the state of the art, comprising two tubular section pieces attached together and intended to be compressed by the same opening leaf;

FIG. 3: a cross section of a third seal of a known type, comprising a single tubular section piece which has an internal transverse partition.

The seal depicted in FIG. 1 comprises a U-section section piece 1, for example made of elastomer, equipped with a metal stiffener 2, also of U-shaped section and intended to fit over a protruding edge of a motor vehicle door surround. An acoustic lip 3 protrudes laterally from the base of the U, while lips 4 made of a flexible material such as elastomer project toward the inside of the U from the branches thereof with a view to firmly gripping the protruding edge of the surround.

A tubular section piece 5, for example made of cellular rubber, is attached to one of the branches of the section piece 1 and projects laterally toward the outside of the vehicle, on the opposite side from the lip 3. This section piece 5 is intended to be compressed between the door surround and this door when the latter is in the closed position, so as to seal the cabin and soundproof it, and is pierced with orifices 6 arranged at regular or irregular intervals along the section piece to allow air to pass to the outside of the section piece into it.

This seal may be made in a single coextrusion operation.

To improve the qualities of such a seal, it has been proposed for use to be made of two tubular section pieces attached to each other, as depicted in FIG. 2. In that figure, the members which have already been described with reference to FIG. 1 are denoted by the same reference numerals and the second tubular section piece is denoted by the reference 7.

The inside of the section piece 7 communicates with the outside via at least one orifice 8 pierced in its side wall, and it is therefore necessary to make two holes or two series of holes in the section pieces 5 and 7, which makes the manufacturing operations more complicated.

A seal such as this also presents greater resistance to the closing of the opening leaf and does not appreciably improve the soundproofing of the vehicle because, as in the case of the seal of FIG. 1, the sound waves pass simply twice through the walls of the section piece 5 or of the section piece 7 before entering the cabin.

In order to overcome this latter drawback, it has therefore been proposed to provide a transverse partition 9 in the tubular section piece 5, as depicted in FIG. 3 in which the members already described with reference to FIG. 1 are denoted by the same reference numerals.

A seal such as this presents better soundproofing qualities because the sound waves have to pass through three walls (twice through that of the section piece 5 plus the partition 9) before entering the cabin. By contrast, the partition 9 stiffens the section piece 5 and, aside from the orifice or orifices 6 made in the wall of this section piece, it is also necessary to make one or more holes 10 in the partition 9 to allow the two compartments that this partition separates to communicate, which makes the operations of manufacturing the seal significantly more complicated. Finally, the presence of the partition 9 complicates the deforming of the tubular section piece in the corners of the door surround or in the regions near the door hinges.

JP 61 241 228 A (Patent Abstracts of Japan, vol 11, No. 86, (M-572) of Mar. 17, 1987) discloses a tubular seal intended to be mounted on the B-pillar of the bodywork of a motor vehicle, that is to say on the upright which separates a front door from a rear door of the vehicle. According to that Japanese document, two glazed frameless door panels compress this seal when closed so that a decorative part of the seal sits between the two panels so as to be visible from the exterior. In this position, a portion of that decorative part protruding toward the outside of the seal bears against a pillar which projects toward it from opposite it so as, it is said, to restrict the movement of the decorative part, which is thus centered between the two panels.

However, that seal is not intended to be compressed between an opening leaf of a motor vehicle and a surround of the opening associated with this opening leaf, because it extends only along the height of the B-pillar of the bodywork and, assuming that it had a soundproofing effect, a fact that is neither indicated nor mentioned, this effect can only be very unsatisfactory. The sought-after technical effect is moreover entirely different insofar as the aim is simply to hold a decorative part of the seal in an appropriate position between the door panels.

The present invention sets out to overcome these drawbacks of the prior art by proposing a seal of the same overall type, comprising a single tubular section piece the side wall of which does, however, have one or more holes allowing the inside and the outside of the section piece to communicate, this section piece thus being able to deform easily under the influence of an opening leaf, but comprising means such that in the compressed position it nonetheless presents the sound waves with more than two barriers to be crossed before they enter the cabin of the vehicle, the soundproofing of which is thus significantly improved.

To this end, the subject of the invention is a seal with a soundproofing effect for a motor vehicle opening leaf, intended to be fitted to this opening leaf or a surround of an opening of the vehicle bodywork associated with this opening leaf, this seal comprising a tubular section piece made of an elastically deformable material able to be secured to the opening leaf or to the surround while projecting outward therefrom, so as to be able to be compressed and deformed between the surround and the opening leaf when the latter is in the closed position, at least one orifice being pierced in the side wall of the tubular section piece so as to place the inside and the outside of this section piece in communication, this seal being characterized in that at least a first flexible lip projects toward the inside of the tubular section piece from the part contiguous with the opening leaf or the surround to which it is fitted, while at least a second flexible lip projects toward the inside of the tubular section piece in the direction of the first lip from the opposite portion of the wall of the section piece, the dimensions of the first and second lips being such that, when the tubular section piece is in the compressed position, these lips can substantially come into mutual contact or into contact with the opposite wall of the section piece, to form a barrier in the path of the sound waves headed for the cabin.

In practice, as will be seen hereinbelow, a single first lip and a single second lip may be provided in the tubular section piece. The latter may also be equipped with two first lips and just one second lip or vice versa, to make it easier for these lips to come into contact with each other or with the wall opposite as the tubular section piece is compressed by the opening leaf and the resulting deformation, particularly in the corner portions of the surround of the associated opening or in the region of the hinges.

The tubular section piece, which has no continuous internal partition, exhibits great flexibility and can therefore easily be deformed by the opening leaf. Furthermore, only the side wall of this tubular section piece has orifices for the passage of air and the operations of making holes in this wall are therefore as easy as in the case of the seal of FIG. 1.

The means of attaching the seal to the opening leaf or to the surround of the opening made in the bodywork for this opening leaf may be of any type known in the state of the art.

In particular, the seal may comprise a U-section piece forming a clip, made of elastomer or plastomer, the latter of which is deemed to designate a resilient thermoplastic composition of matter comprising a resilient phase; generally, made of a block copolymer-embedded in a thermoplastic phase; capable of fitting onto and gripping a projecting part of the surround of the vehicle opening associated with the opening leaf, the tubular section piece being attached to a branch or to the base of the U-section piece so as to project toward the outside of the surround.

The tubular section piece may also be attached to a foot able to be bonded or fixed, for example by clipping, onto the opening leaf or onto the surround of the associated opening of the bodywork.

Other features and advantages of this seal will become apparent in the detailed description which will follow of various embodiments of the seal according to the invention. In this description, reference will be made to FIGS. 4 to 8 of the appended drawings, in which.

Figure 1:
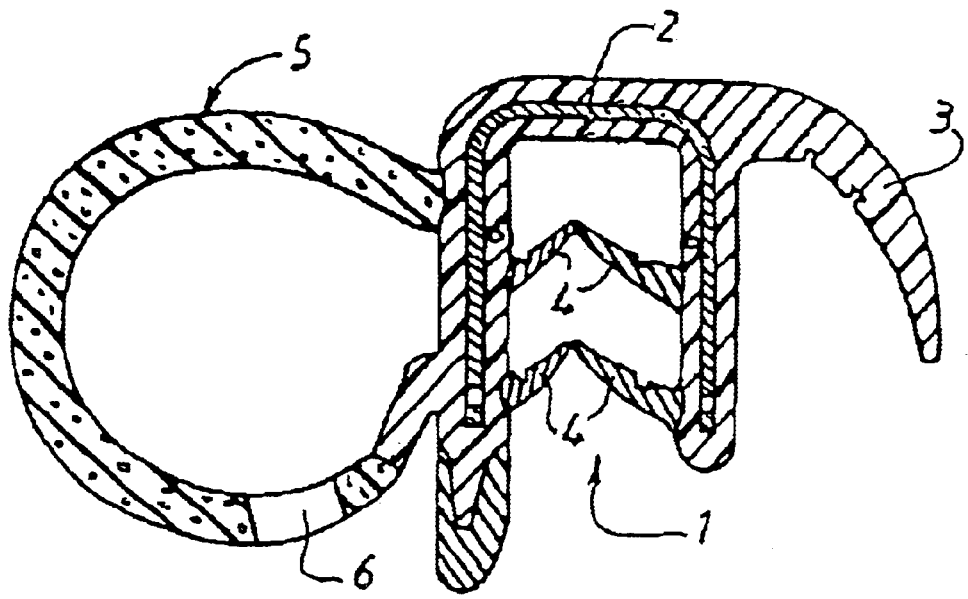
Figure 2:
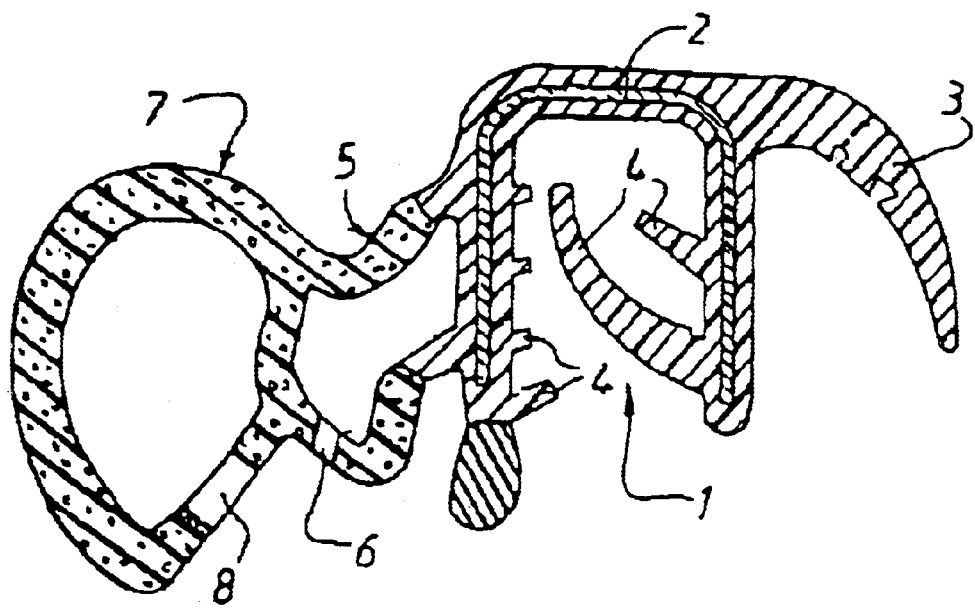
Figure 3:
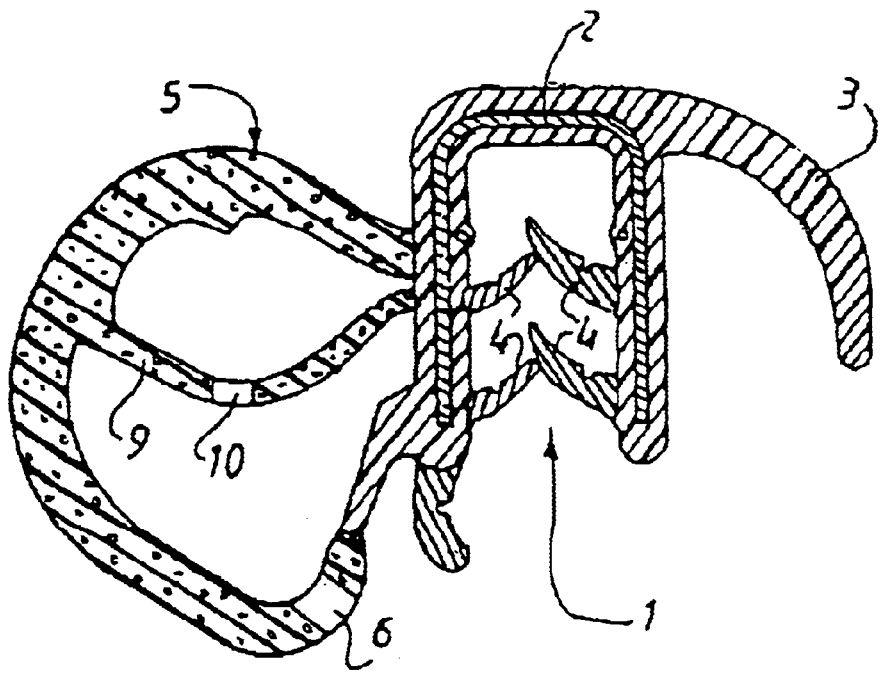

In the seal of FIG. 4, there is again a section piece forming a clip 11, of U-shaped cross section, made of elastomer or plastomer and with a metal stiffener 12, from the base of which a lip 13 projects laterally outward, while lips 14 made of an elastically deformable material project toward the inside of the section piece, from each branch of the U, in the direction of the branch opposite.

As in the state of the art, a tubular seal 15 made of an elastically deformable material protrudes laterally toward the outside, here from one branch of the section piece 11, on the opposite side from the lip 13, so as to be compressed between a protruding edge of a door surround, which fits over and grips the section piece 11, and this door when the latter is in the closed position. The section piece 15 could naturally be attached to the base of the U of the section piece 11 that forms the clip. The side wall of this section piece 15 is pierced with at least one orifice 16 for the passage of air from the inside to the outside of the section piece.

In accordance with the invention, a first flexible lip 17 projects toward the inside of the tubular section piece 15, from that branch of the section piece 11 to which this tubular section piece is attached, while a second flexible lip 18 also projects toward the inside of the section piece 15, in the direction of the lip 17, from that portion of the wall of this section piece which is opposite this lip 17.

Figure 5:
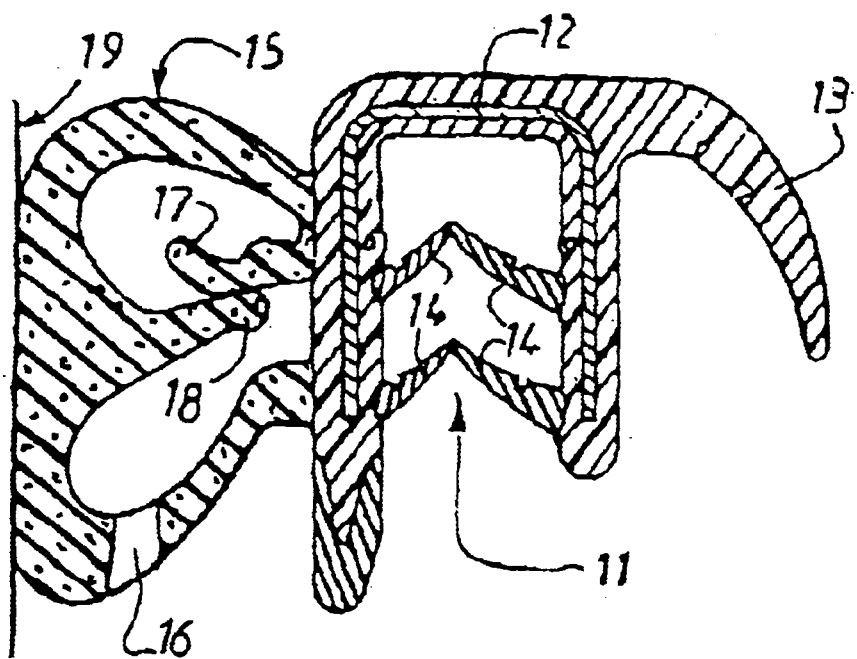
FIG. 5 depicts the seal of FIG. 4 compressed by an opening leaf.

These two lips have dimensions such that, as can be seen in FIG. 5, when the tubular section piece 15 is compressed and deformed by a door 19 (or other opening leaf) when the latter is in its closed position, these lips 17, 18 come into a contiguous position, in mutual contact, with partial overlap, so as to form a barrier of partially double thickness in the path of the sound waves, or in contact with the wall opposite, forming multiple partitions, thus considerably improving the soundproofing of the cabin of the vehicle.

The flexible lips 17 and 18 are far easier to produce than a continuous internal partition in the tubular section piece 15 and do not present any resistance to compression of this section piece at the beginning of closure. Furthermore, only the wall of the section piece requires holes, and the seal according to the invention is therefore of low cost by comparison with those of the state of the art, while at the same time offering far more satisfactory soundproofing performance and deformation in all the corners.

Figure 4:
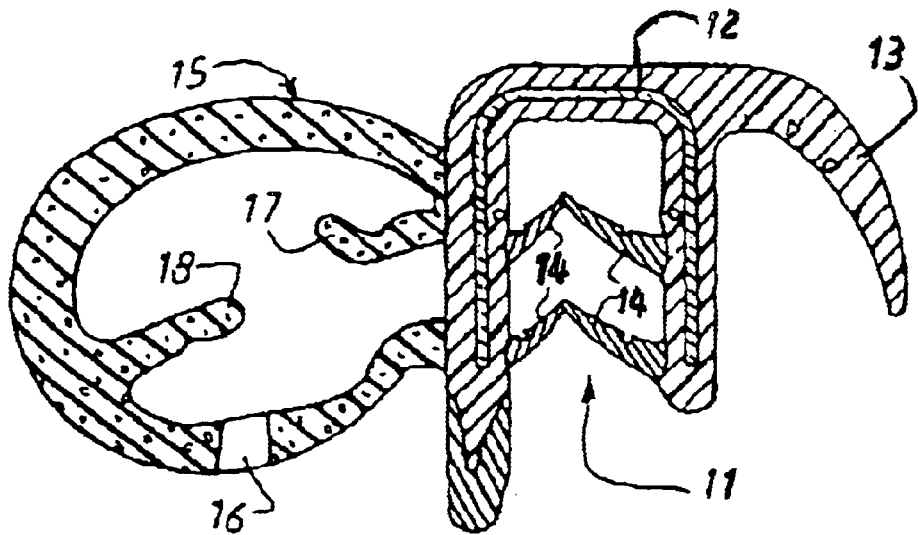
FIG. 4 is a view in cross section of a first embodiment of a seal according to the invention.
Figure 6:
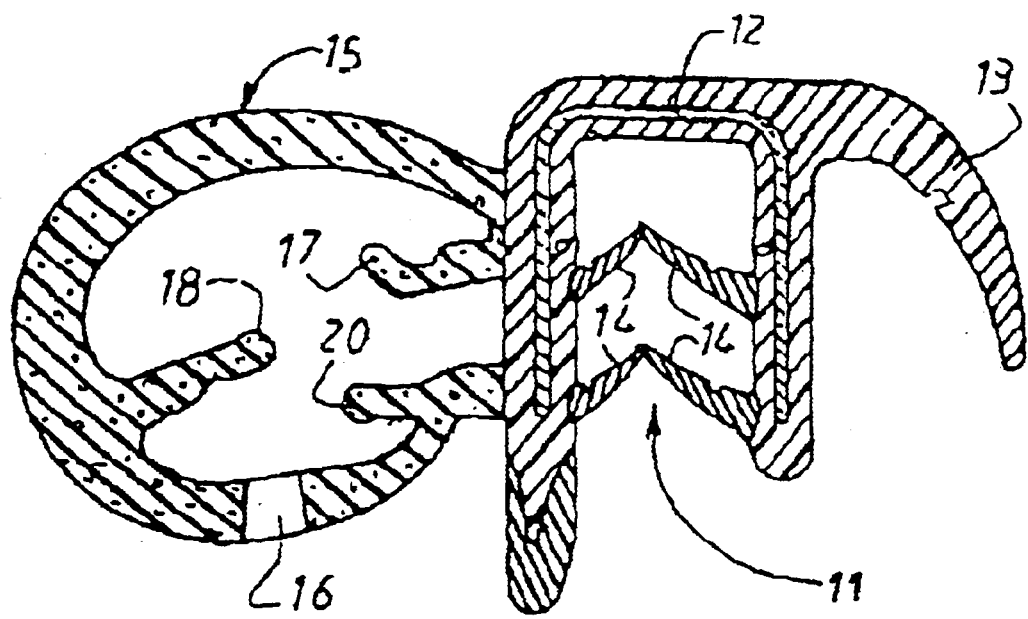
FIG. 6 is a cross section of another embodiment of the seal according to the invention.

The seal of FIG. 6 is in every respect identical to that of FIG. 4 and members which are similar are denoted by the same reference numerals, but it incorporates a third lip 20 projecting toward the inside of the tubular section piece 15 in the direction of the lip 18 from the branch of the section piece 11 to which the tubular section piece 15 is attached. This third lip 20 is intended to make it easier to produce an additional transverse barrier in the path of the sound waves headed for the inside of the section piece 15 when the latter is compressed by the door, by means of the positioning in mutual contact, with partial overlap, of the lip 18 and of the lip 17 and/or of the lip 20. This is particularly advantageous when the door surround has portions with very tight corners, in which the section piece 15 has to deform in a different way in these corners than in the other parts of the surround.

Naturally, instead of projecting toward the inside of the section piece 15 from the branch of the section piece 11 to which this section piece 15 is attached, the third lip could project toward the inside of the section piece 15 from that portion of the wall of this section piece which is opposite the section piece 11, in the direction of the latter. It would also be possible to provide two lips projecting toward the inside of the section piece 15 from the branch of the section piece 11 to which it is attached and two more lips projecting toward the inside of this section piece 15 from that portion of the wall thereof which is opposite the section piece 11, toward the latter.

Figure 7:
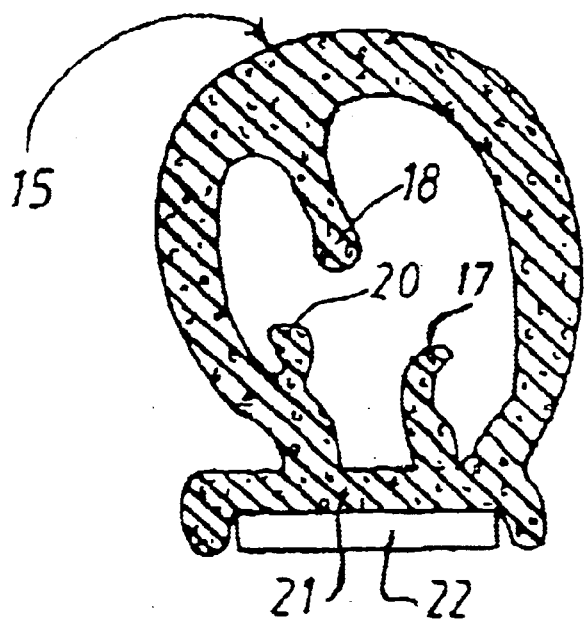
FIGS. 7 and 8 are cross sections of two other seals according to the invention, similar to that of FIG. 4 but comprising different means of attachment to the opening leaf or to the surround of the associated opening of the bodywork.
Figure 8:
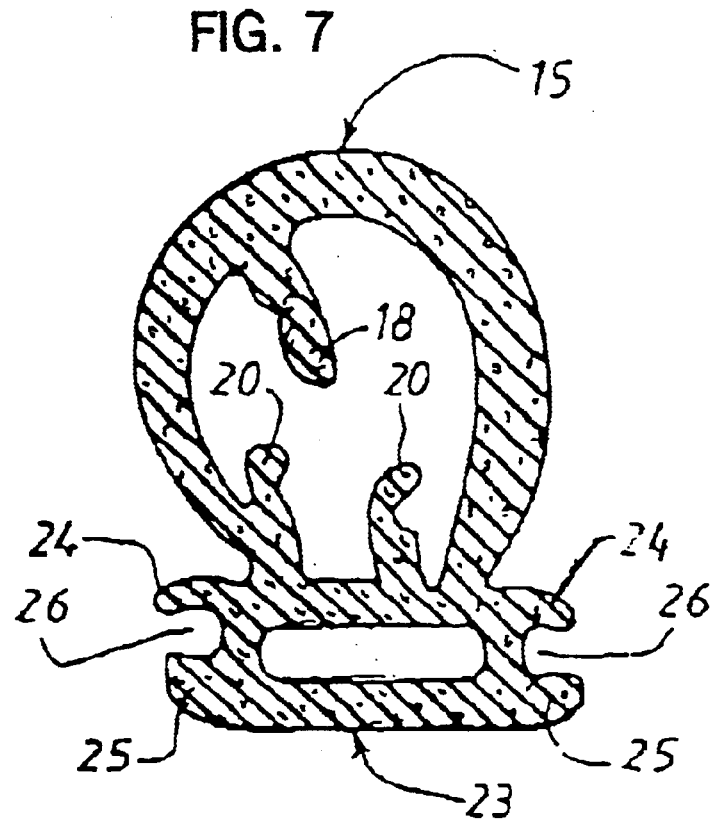

FIGS. 7 and 8, in which members already described in relation to FIG. 6 are denoted by the same reference numerals, illustrate embodiments of the seal according to the invention in which the tubular section piece is equipped with means, which differ from those of FIG. 6, for fixing to the opening leaf or to the surround of the opening of the bodywork to which it is fitted.

In the embodiment of FIG. 7, the tubular section piece 15 comprises a foot 21 integral with the section piece and from which the lips 17 and 20 project toward the inside of the section piece in the direction of the lip 18 attached to the wall opposite it. This foot 21 may be simply bonded onto a part 22 of the opening leaf or bodywork of the vehicle.

In the alternative form that is FIG. 8, the tubular section piece 15 once again has a foot 23, this time of tubular profile, from which lips 24 and 25, defining recessed parts 26 forming slideways, project laterally, it being possible for projecting parts of the opening leaf or of the bodywork of the vehicle to be engaged in these slideways by clipping.

In all these alternative forms, the seal according to the invention can naturally be produced simply, like the seals of the prior art, by extrusion or coextrusion of thermoplastic or elastic materials.

What is claimed is:

1. A seal providing a soundproofing effect for a motor vehicle opening leaf (19), said seal being fitted to said opening leaf or a surround of an opening in a vehicle bodywork operatively associated with said opening leaf, said seal comprising a tubular section piece (15) of an elastically deformable material which is securable to the opening leaf or to the surround while projecting outwardly therefrom so as to be compressed and deformed between the surround and the opening leaf (19) when the latter is in the closed position, at least one orifice (16) being formed in the side wall of the tubular section piece (15), a first flexible lip (17) projecting inwardly from the interior wall of said tubular section piece (15), at least one second flexible lip (18) projecting toward the inside of the tubular section piece in a direction towards the first lip (17) from an opposite portion of the interior wall of the tubular section piece, the dimensions of the first and second lips (17, 18) being such that, when the tubular section piece (15) is in a compressed position upon closing of said opening leaf (19), said lips (17,18) are in a substantially overlapping mutual surface contact or in contact with the opposite wall of the tubular section piece to form a sealed chamber having an outer surface thereof compressively contacted by said closed opening leaf (19) and producing a barrier in the path of any sound waves propagating towards a cabin of the motor vehicle.

2. A seal according to claim 1, wherein said tubular section piece (15) comprises two mutually spaced said first lips (17, 20) and at least one said second lip (18) engageable between said first two lips (17,20) so as to form said sealed chamber upon closing of said opening leaf (19) contacting said sealed chamber outer surface.

3. A seal according to claim 2, wherein the tubular section piece (15) comprises at least one said first lip and two mutually spaced said second lips having said first lip in surface contact engageable therebetween.

4. A seal according to claim 1, wherein said seal comprises a section piece (11) of U-shaped cross section forming a clip constituted of an elastomer or a plastomer, for being fitted onto and gripping a projecting part of the surround of the vehicle opening associated with the opening leaf (19), said tubular section piece (15) being attached to selectively a branch or to a base of said U-section section piece (11) so as to project toward the outside of the surround.

5. A seal according to claim 1, wherein said tubular section piece (15) is attached to a foot (21) which is bonded into a part (22) of the opening leaf or of the surround to which the seal is fitted.

6. A seal according to Claim wherein said tubular section piece (15) is attached to a foot (23) which is fixed onto the opening leaf or the surround to which the seal is fitted.

* * * * *